(12) United States Patent
Ross

(10) Patent No.: US 7,565,567 B2
(45) Date of Patent: Jul. 21, 2009

(54) HIGHLY AVAILABLE COMPUTING PLATFORM

(75) Inventor: Alan D. Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 475 days.

(21) Appl. No.: 11/282,976

(22) Filed: Nov. 18, 2005

(65) Prior Publication Data

US 2007/0168690 A1 Jul. 19, 2007

(51) Int. Cl.
*G06F 11/00* (2006.01)

(52) U.S. Cl. ............................................. 714/4; 714/2

(58) Field of Classification Search ............ 714/4, 714/2, 1, 11–13
See application file for complete search history.

(56) References Cited

U.S. PATENT DOCUMENTS

| | | | | |
|---|---|---|---|---|
| 5,621,885 A * | 4/1997 | Del Vigna, Jr. | ................ | 714/13 |
| 6,629,260 B1 * | 9/2003 | Dancer et al. | ................ | 714/3 |
| 6,934,880 B2 * | 8/2005 | Hofner | ................ | 714/10 |
| 7,117,393 B2 * | 10/2006 | Baba et al. | ................ | 714/25 |
| 7,178,059 B2 * | 2/2007 | Greenspan et al. | ............ | 714/13 |
| 2003/0097610 A1 * | 5/2003 | Hofner | ................ | 714/10 |
| 2003/0214525 A1 * | 11/2003 | Esfahany | ................ | 345/700 |
| 2005/0213768 A1 | 9/2005 | Durham | | |
| 2005/0216577 A1 | 9/2005 | Durham | | |
| 2007/0226220 A1 * | 9/2007 | Aronoff et al. | ................ | 707/8 |

OTHER PUBLICATIONS

Intel Information Technology, "Intel Active Management Technology", Aug. 2004, pp. 1-12.
Sahita et al., U.S. Appl. No. 11/096,591, filed Mar. 31, 2005.

* cited by examiner

*Primary Examiner*—Dieu-Minh Le
(74) *Attorney, Agent, or Firm*—Blakely, Sokoloff, Taylor & Zafman LLP

(57) ABSTRACT

System resources can be monitored for error or failure. In the event of a failure, an availability module can fail the system over from the corrupt resource to a backup resource.

19 Claims, 7 Drawing Sheets a high availability capability module or manager (HACM). Failure can be classified for ease of description into three main areas, although these areas should be understood as general, and not limiting. In one example an operating system or other software component may experience contamination. Contamination may result from malware or hacker attack. Contamination can be considered to be a compromise of the integrity of the system. In one embodiment, the software environment on the computing platform can be separated into virtual partitions. The HACM can monitor the availability and health of a primary virtual partition (e.g., a primary operating system partition or some other component of the software computing environment). If the partition enters a condition where it ceases to respond to commands/requests, the HACM can switch to a stable partition to allow the user to continue to work. In one embodiment, the switch to the stable partition can be seamless and of little or no notice to the user. In one embodiment, the HACM can coordinate with the AMT (Advanced Management Technology) platform available from INTEL CORPORATION of Santa Clara, Calif., which provides monitoring and detection of corrupt and/or infected systems. The AMT platform could indicate the error to the HACM, which could switch from one partition to another.

In another example a hardware failure could occur. One type of hardware failure/corruption possible is that of the hard drive. In one embodiment, a computing platform is provided with an additional hard drive and/or an additional storage component. For example, a laptop may include a standard hard drive with a secondary hard drive or semiconductor-based storage component. The secondary storage component is not necessarily of the same size as the primary component. In one embodiment, the system operates with RAID (redundant array of independent/inexpensive disks/drives) between the multiple storage components. For example, a RAID 5 implementation can prevent loss of data even if one of the storage components fails. In one embodiment, the HACM could detect a hard drive failure and initiate communication with a remote management console to alert an administrator of the failure, and switch service over to the single remaining storage component.

In another example a communication failure could occur. In the case of either wired or wireless connections, in one embodiment, the HACM could use the AMT capability of an out-of-band (OOB) communication link or channel to attempt to repair the connection. In a wireless connection scenario, the HACM could switch to a software defined radio (SDR) to attempt to establish a connection.

Thus, the HACM can provide monitoring and management of multiple resource types, whether software or hardware. A single management module can therefore provide management of heterogeneous resources, and provide protection when any of the different type of resources may fail.

FIG. 1 is a block diagram of an embodiment of a host system with a high availability capability module (HACM). Host system 100 represents an electronic system or computing system. For example, host system 100 can be a mobile computing device or mobile computing platform. Mobile computing devices may include laptop computers, handheld computing systems, personal digital assistants (PDAs), smart phones, etc. Host system 100 includes bus or bus system 102. Bus 102 is understood to be any number of lines, components, bridges, etc., to provide interconnectivity among multiple platform components. Bus 102 may include one or more multi-drop and/or single drop communication paths. Bus 102 represents one mechanism for coupling components with one another. Other forms of interconnection or coupling could be used. As used herein, coupled does not necessarily mean

HIGHLY AVAILABLE COMPUTING PLATFORM

FIELD

Embodiments of the invention relate to computing devices, and more particularly to a capability module to switch from unavailable to available resources.

BACKGROUND

When a user's computing resources are unavailable due to error, the unavailability may result in significant loss of time and efficiency because of rendering the user unable to work. The increased use of mobile platforms has enabled users to engage in work from most any location. However, the use of mobile platforms exacerbates the problem of resource unavailability because a user's mobile platform may experience error far away from the office or from an administrator or other computing resource that can help the user be productive again. Failure of hardware (e.g., hard drives) and/or operating system corruption can lead to loss of data, reduced productivity, and can interrupt service for long periods of time. The net result can be significant costs to both the user and a corporation employing the user.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
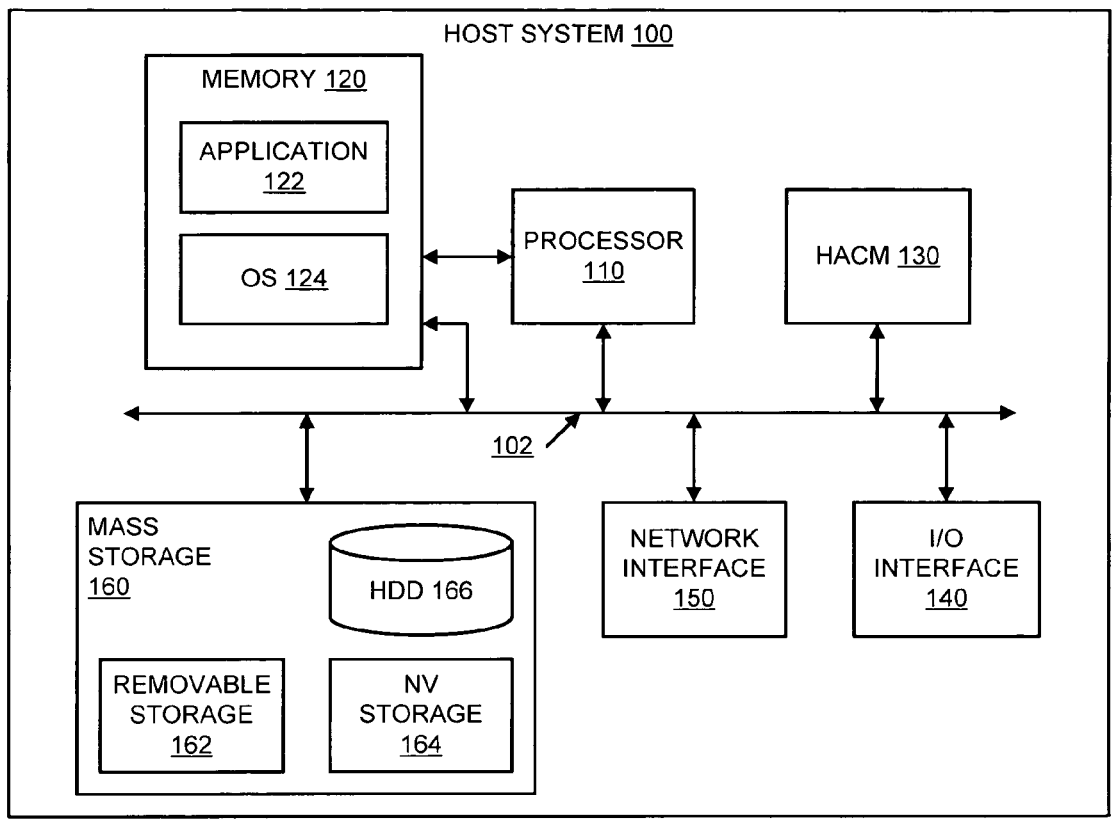
FIG. 1 is a block diagram of an embodiment of a host system with a high availability capability module (HACM).

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

A highly available platform can provide the ability for a user to continue to work, even if a computing resource experiences a failure. The highly available platform is provided by physically connected, although it may. Coupled or interconnected could mean physical connectivity, communicative coupling, and/or electrical coupling.

Processor 110 represents one or more computing elements of host system 100. Processor 110 can be any type of computing element, and may include one or more central processing units (CPUs), processing cores, digital signal processors (DSPs), programmable logic devices (PLDs), microcontrollers, etc., or some combination of these. Processor 110 generally provides computing resources to host system 100, and executes the main operations of host system 100. Host system 100 also includes memory 120, which may include one or more components of random access memory (RAM), including dynamic RAM (DRAM), synchronous DRAM (SDRAM), dual data rate RAM (DDR RAM), etc., or some combination of these. In general memory 120 provides temporary storage to provide instructions and data for processor 110 to compute/execute. Memory 120 can provide a resource into which to load programs to be executed on host system 100. Among other data or instructions stored in memory 120, memory 120 can include one or more applications 122 and an operating system (OS) 124. OS 124 is a main component of a software computing environment of host system 100.

In one embodiment, an additional copy of OS 124, or a separate OS can reside in a separate partition of host system 100. The separate partition(s) could exist in mass storage 160, to be discussed below. Briefly, OS 124 can be considered the primary OS or the primary partition, because it is active on host system 100.

Host system 100 also include one or more input/output (I/O) interfaces 140, which represent one or more components to provide interactivity with a user and/or interconnection with peripheral components and devices of host system 100. Host system 100 may include one or more network interfaces 150, which may be wired and/or wireless. In one embodiment, host system 100 includes both wired and wireless interfaces, and includes a software defined radio (SDR), which enables host system 100 to generate potentially multiple versions of a wireless connectivity device through software definitions that control software-controlled hardware components that operate as a radio. Network interface 150 represents both hardware components (e.g., interface circuits, interface ports, controllers) as well as software components to run the hardware components (e.g., drivers), for either or both of wired or wireless interfaces.

Host system 100 includes mass storage 160, which represents one or more components to store data and/or programs in a non-volatile manner. Non-volatile storage is storage that maintains its information even if power is removed to the storage device. Thus, mass storage 160 may include one or more removable storage devices 162 (e.g., optical/magnetic disk drives), non-volatile storage 164 (e.g., flash or other semiconductor-based storage system, including universal serial bus (USB) storage compatibility), or magnetic hard disk drives (HDD) 166, or some combination of these.

In one embodiment, host system 100 includes HACM 130 to monitor and/or manage one or more resources of host system 100. For purposes of simplicity, HACM 130 as described herein could be considered to include one or more functional components of an AMT platform, if applicable. Otherwise, HACM 130 can be considered to include all functionality within itself, including those functions that might otherwise be performed by another entity, such as an AMT component. Among resources of host system 100 that could be monitored, host system 100 includes several components generally considered to be highly significant to the computing environment of host system 100. These components are system software components, system hardware, and communication components. For simplicity in description, OS 124, mass storage 160, and network interface 150 will be discussed in detail as particular examples of these categories. As discussed above, these components may experience errors or fail. The failure could be detected via a loss of connectivity to a monitoring device (e.g., HACM 130), or via a change in state or status of the monitored resource. In one embodiment, the resource may indicate an error to HACM 130.

To provide high availability capability to host system 100, a monitored resource may include a backup resource. For example, OS 124 may be backed up by an OS on another partition stored in mass storage 160, which may not be accessible to OS 124. HACM 130 could switch from OS 124 to the backup if OS 124 became corrupted. In another example, network interface 150 may be backed up by having a mechanism to allow HACM 130 to attempt to switch from a wired to a wireless connection, or vice versa. Because of the prevalence of wireless connectivity, a backup mechanism may be the ability of HACM 130 to construct an SDR if a first wireless connection fails. In another example, mass storage 160 may be backed up by having multiples of the main storage resource. For example, a system could include two physically separate hard disk drives in case of hardware failure of one disk. One disk could be operational, and the other disk in a locked state to reduce the risk that physical damage would occur to both simultaneously (e.g., a laptop being bumped or dropped). In another embodiment, a hard disk drive may be backed up with several gigabytes of flash. In case the backup device does not store as much as the primary device, HACM 130 could manage storage onto the backup to include critical system components and particular files being used to reduce the risk of data loss and system availability.

Figure 2:
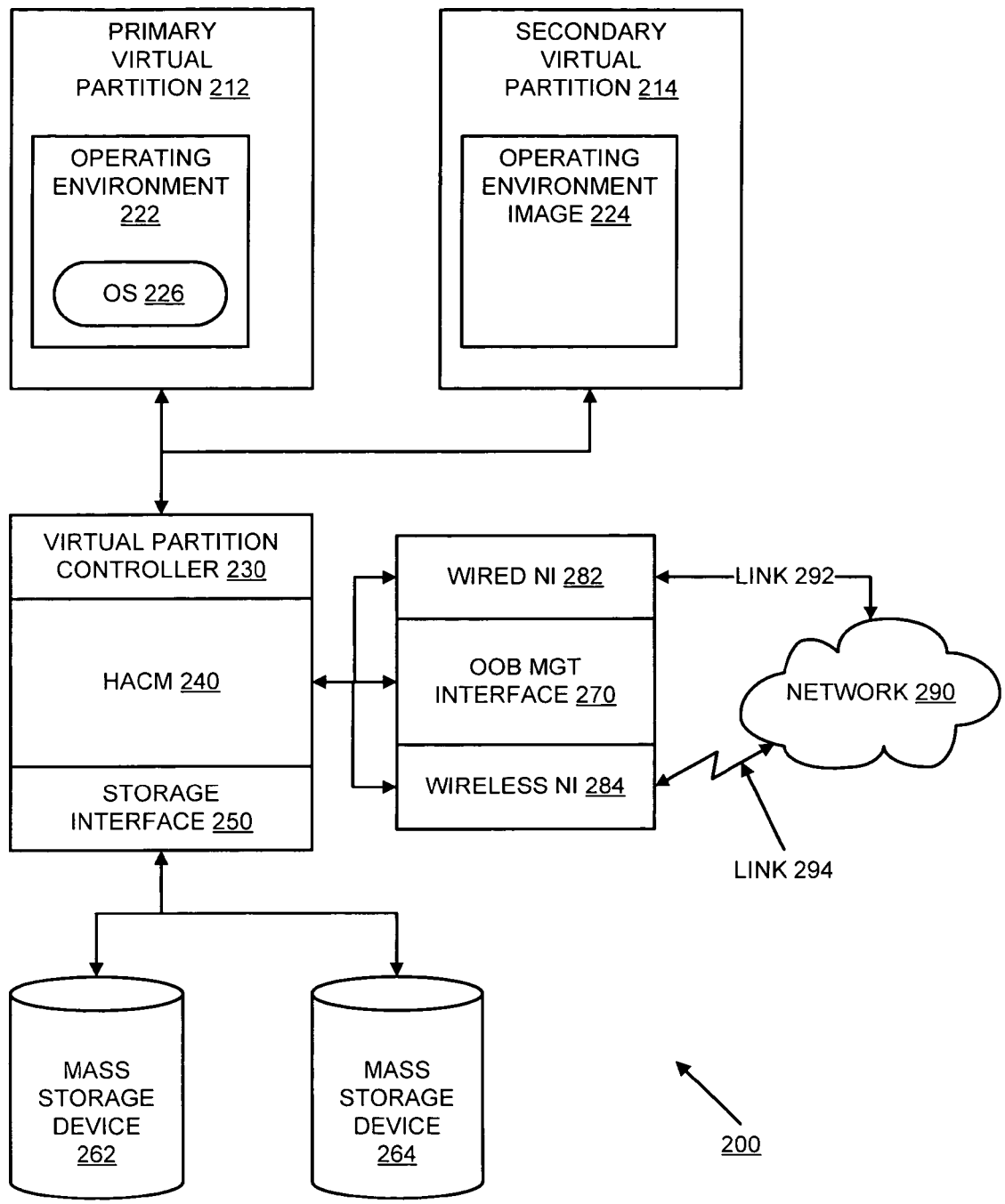
FIG. 2 is a block diagram of an embodiment of a system having a high availability capability module (HACM) and multiple system resources with backup.

FIG. 2 is a block diagram of an embodiment of a system having a high availability capability module (HACM) and multiple system resources with backup. System 200 may be one implementation of a system according to system 100 of FIG. 1. System 200 is shown with various possibilities of system resources having backups for use with a highly available platform. One resource shown with a backup is a software computing environment. System 200 includes primary virtual partition 212 and secondary virtual partition 214. Virtual partitions 212-214 could be separate virtual partitions that may be unaware of each other. In one embodiment, the virtual partitions are separate virtual partitions according to VT (virtual technology) technology available from INTEL Corporation of Santa Clara, Calif. The partitions could be activated by a management entity (e.g., HACM 240). Primary virtual partition 212 provides/includes operating environment 222, upon which system 200 can operate. Operating environment 222 includes OS 226, which could be an essential component of the operating environment. Secondary virtual partition 214 includes operating environment image 224, which may represent an image of system components, OS 226, and/or other software to provide an operating environment for system 200. Secondary virtual partition 214 with operating environment image 224 can provide a backup for primary virtual partition 212 in case of an unrecoverable error in primary virtual partition 212.

In one embodiment, HACM 240 monitors primary virtual partition 212 to determine that operating environment 222 is stable. If instability is detected by lack of responsiveness, error condition, corruption, etc., HACM 240 can switch from primary virtual partition 212 to secondary virtual partition 214, automatically, and possibly seamlessly. Thus, a switch can occur that is not perceptible to a user of system 200. In one embodiment, HACM 240 can conduct or direct diagnostics to be performed on primary virtual partition 212 to determine if an error is recoverable, or unrecoverable. A switch may be unnecessary if the error is recoverable. In one embodiment, HACM 240 switches from primary virtual partition 212 to secondary virtual partition 214, and eliminates primary virtual partition 212, which would presumably be corrupt. HACM 240 may additionally spawn a new partition. Thus, what is shown as secondary virtual partition 214 would be the "primary" partition after the switch, and a tertiary virtual partition would become the secondary, or backup, partition to secondary partition 214, to act as a backup in case of another error. In one embodiment, HACM 240 includes an error detection mechanism that could prevent HACM 240 from spawning endless numbers of virtual partitions due to some systematic error that might be able to compromise not only primary virtual partition 212, but also secondary virtual partition 214 and any other virtual partitions generated.

HACM 240 can interface with virtual partitions 212 and 214 through virtual partition controller 230, which might include functionality mentioned above to add and remove partitions. In one embodiment, system 200 includes mass storage devices 262-264, which can interface with HACM through storage interface 250. In one embodiment, virtual partition controller 230 and storage interface 250 are components of system 200 regardless of the presence or absence of HACM 240. In such an implementation, HACM 240 can interface with these components present on system 200. In other implementations, HACM 240 includes the functionality represented by virtual partition controller 230 and/or storage interface 250. In another embodiment, the functionality of virtual partition controller 230 and/or storage interface 250 can be considered to be "part" of HACM 240, which may represent coordinated functionality present in multiple components of system 200.

Mass storage devices 262-264 can be understood as non-volatile storage resources, as discussed previously. In one embodiment, storage interface 250 includes a RAID controller to implement RAID storage across mass storage devices 262-264. If one of the storage devices were to fail, HACM 240, through storage interface 250, could manage the system storage with a single device. In one embodiment, mass storage device 262 acts as a primary storage resource, with information mirrored to mass storage device 264 for purposes of backup. If mass storage device 262 were to fail, mass storage device 264 could be utilized as a single hard drive. In one embodiment, HACM 240 can notify the user of the error experienced to allow the user to take action. In one embodiment, HACM 240 informs a remote administrator through an OOB, and possibly secure, communication link of the error.

In one embodiment, system 200 includes OOB management interface 270 to provide OOB communication through a network interface. In one embodiment, HACM 240 interfaces with wired network interface 282 and wireless network interface 284 through OOB management interface 270. However, HACM 240 may also be able to separately monitor and interact with network interfaces 282-284 without OOB management interface 270. In one embodiment, wireless network interface 284 includes SDR functionality. Thus, HACM 240 can generate or spawn a backup resource to a wireless network link through the use of software radio definitions that produce wireless communication functionality. The presence of SDR functionality in wireless network interface 284 may not be able to protect system 200 against an error in wireless network interface circuitry. Wired network interface 282 may include cable, coaxial, and/or twisted pair interface ports and/or support hardware/circuitry.

Figure 3:
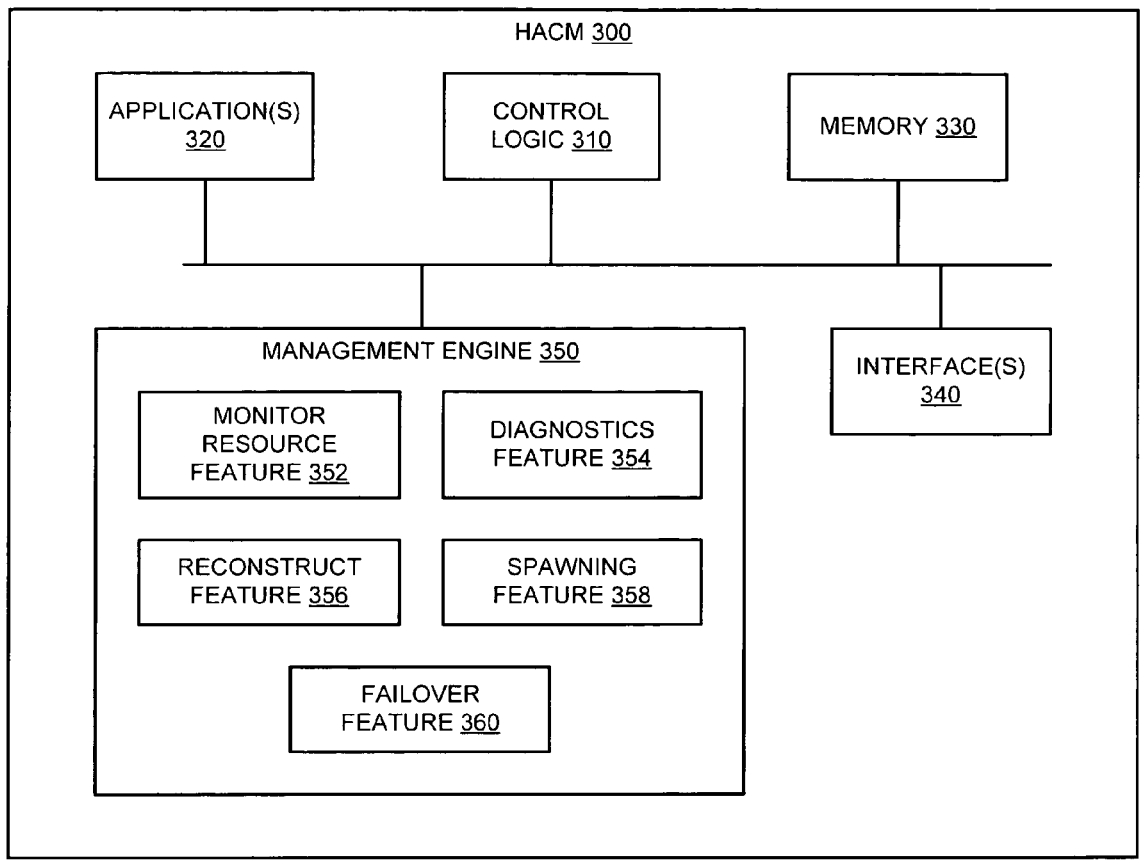
FIG. 3 is a block diagram of an embodiment of a high availability capability module (HACM).

FIG. 3 is a block diagram of an embodiment of a high availability capability module (HACM). HACM 300 includes control logic 310, which implements logical functional control to direct operation of HACM 300, and/or hardware associated with directing operation of HACM 300. In one embodiment, HACM 300 includes one or more applications 320, which represent code sequence and/or programs that provide instructions to control logic 310. HACM 300 includes memory 330 and/or access to memory resource 330 for storing data and/or instructions. HACM 300 also includes one or more interfaces 340, which represent access interfaces to/from HACM 300 with regard to entities (electronic or human) external to HACM 300.

HACM 300 also includes management engine 350, which represents one or more functions that enable HACM 300 to provide management of system resources. The functions include, or are provided by, one or more of monitor resource feature 352, diagnostics feature 354, reconstruct feature 356, spawning feature 358, and failover feature 360. Other features may be included, making other versions of management engine 350 that are more or less complex than what is shown. As used herein, feature may refer to a function, a module, a routine, a subsystem, etc., whether hardware, software, or some combination. Thus, "feature" should be interpreted in an illustrative, and not a restrictive sense.

Monitor resource feature 352 enables management engine 350 to monitor and determine if an error occurs with a monitored resource. The resource may provide a heartbeat message and/or an error message to HACM 300 through monitor resource feature 352, or HACM 300 may poll the resource for a response. HACM 300 may obtain information about the resource through a driver or other entity (e.g., a service agent or service processor).

Diagnostics feature 354 enables management engine 350 to attempt to recover the resource. Diagnostics feature 354 may include the capability of causing a driver or system resource to perform a diagnostic routine on the resource. In another embodiment HACM 300 may include sufficient information regarding the resource to be able to perform one or more diagnostic steps and/or a diagnostic routine on the resource. The availability and use of diagnostics is understood in the art, and will not be further discussed here, except as pertains to the HACM, as described herein. In one embodiment HACM 300 may perform diagnostics prior to determining that an error has occurred that will cause a switch from the primary resource to a backup resource.

Reconstruct feature 356 enables management engine 350 to rebuild storage in the case of a storage component being monitored. In one embodiment reconstruct feature 356 enables remote reconstruction of data on a storage device, possibly through an OOB management channel. Reconstruct feature 356 may also enable a user's partition to be rebuilt in the case of a switch from one partition to another. Thus, user preferences could be preserved even in the case of a partition switch.

Spawning feature 358 enables management engine 350 to spawn new backups of resources when a switch has occurred from the primary to a secondary resource. For example, management engine 350 may generate a new virtual partition, or generate a new SDR. Spawning a new backup resource may include tearing down the corrupt resource.

Failover feature 360 enables management engine 350 to switch control of a system of which HACM 300 is a part from a primary resource to a secondary or backup resource. The switching may include changing symbol tables or other values in memory. Much, if not all, of the switch can be performed in the background without interruption to a user.

HACM 300 may include hardware, software, and/or a combination of these. In a case where HACM 300 includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other forms of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above.

Figure 4:
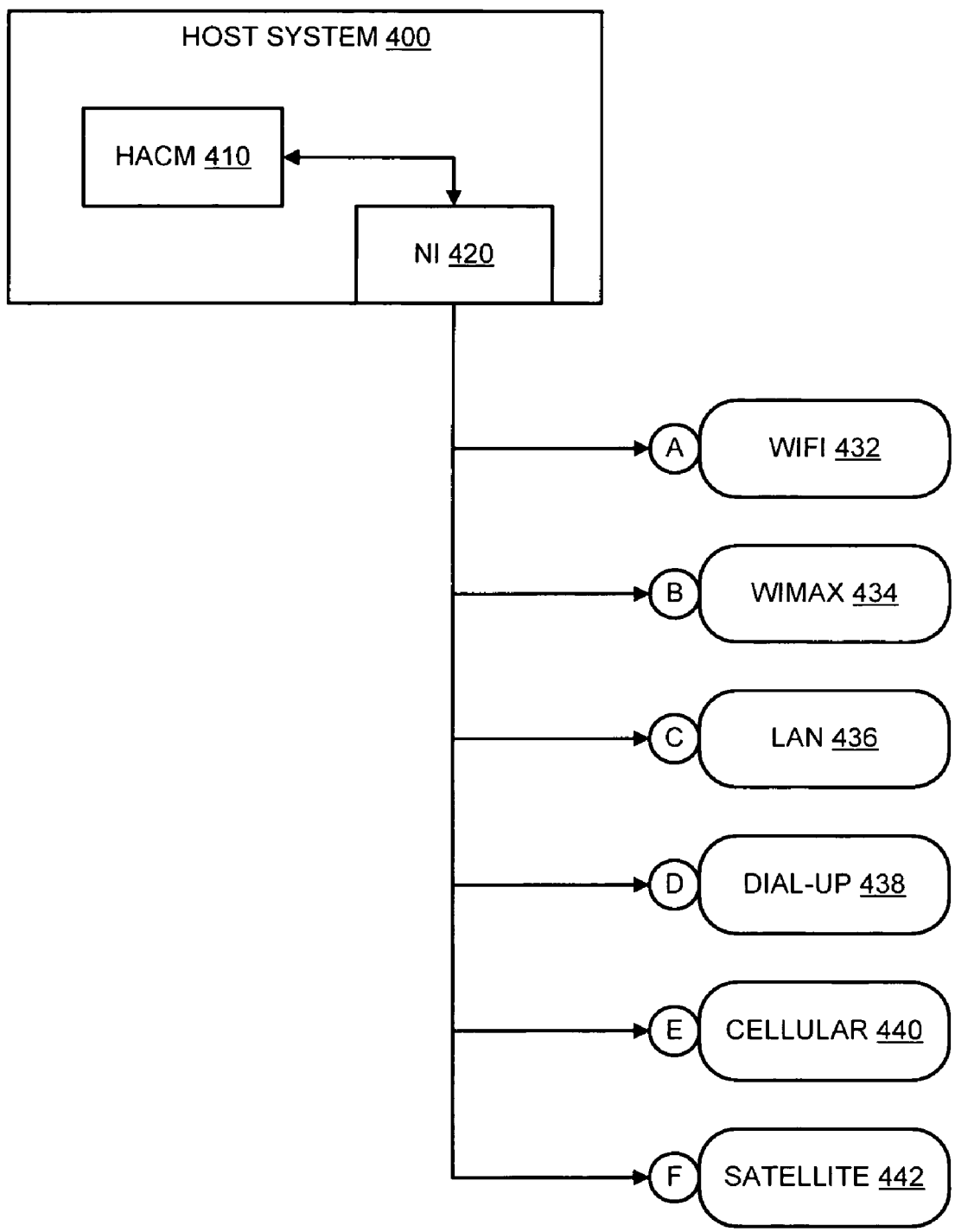
FIG. 4 is a block diagram of an embodiment of a system selecting an interface mechanism.

FIG. 4 is a block diagram of an embodiment of a system selecting an interface mechanism. Host system 400 may be a host system according to any embodiment, previously described. Host system 400 includes HACM 410, which may be coupled with network interface (NI) 420. NI 420 represents hardware components that interface with a network, and may also include software components (e.g., drivers) to interface the hardware components. NI 420 is not necessarily a single circuit or hardware component, although it may be. NI 420 may include one or more mechanisms for connecting to a network. In one embodiment, NI 420 receives direction from HACM 410 to attempt to connect via one or more of various available connection mechanisms when obtaining network connectivity. The mechanisms may be attempted in turn, according to a priority or preference.

For example, NI 420 may attempt connection in order from A to F according to possible connections. Mechanisms A to F may represent all connections available on host system 400, or they may represent all connection types known to HACM 410, whether or not such a mechanism exists on host system 400. In one embodiment, each connection is attempted in turn until a connection mechanism is found that provides network connectivity. Examples of connection mechanisms as shown include Wi-Fi link 432, which represents any of possible short-range wireless connectivity standards (e.g., Institute of Electrical and Electronics Engineers (IEEE) Std. 802.11g—2003, or other IEEE standard in the 802.11 family, or other comparable standard), WiMAX 434, which represents any of possible longer-range wireless connectivity standards (e.g., IEEE Std. 802.16a—January 2003), local area network (LAN) 436, which represents any of possible wireline connections (e.g., Cat-5 connection, Ethernet), dial-up connection 438 (e.g., phone line), cellular connection 440, and satellite connection 442.

In one embodiment, connection mechanisms A to F have a preference order, or an order of priority, and the connection mechanism is selected according to priority. In one embodiment, connection module 412 within HACM 410 may provide monitoring of the connection mechanisms and provide automatic rollover from one connection to another. For example, host system 400 may be connected via WiMAX 434 because no Wi-Fi links are available. However, if host system 400 were to come within range of a Wi-Fi link, connection module 412 of HACM 410 could seamlessly roll the connection over from WiMAX 434 to Wi-Fi 432. To accomplish the rollover, connection module 412 could continue the connection via WiMAX 434 while establishing a connection on Wi-Fi 432. Once the connection via Wi-Fi 432 is established, connection module 412 could switch to receiving data over Wi-Fi 432, and begin to disengage WiMAX connection 434. This could proceed with any of the other connections listed as well.

Figure 5:
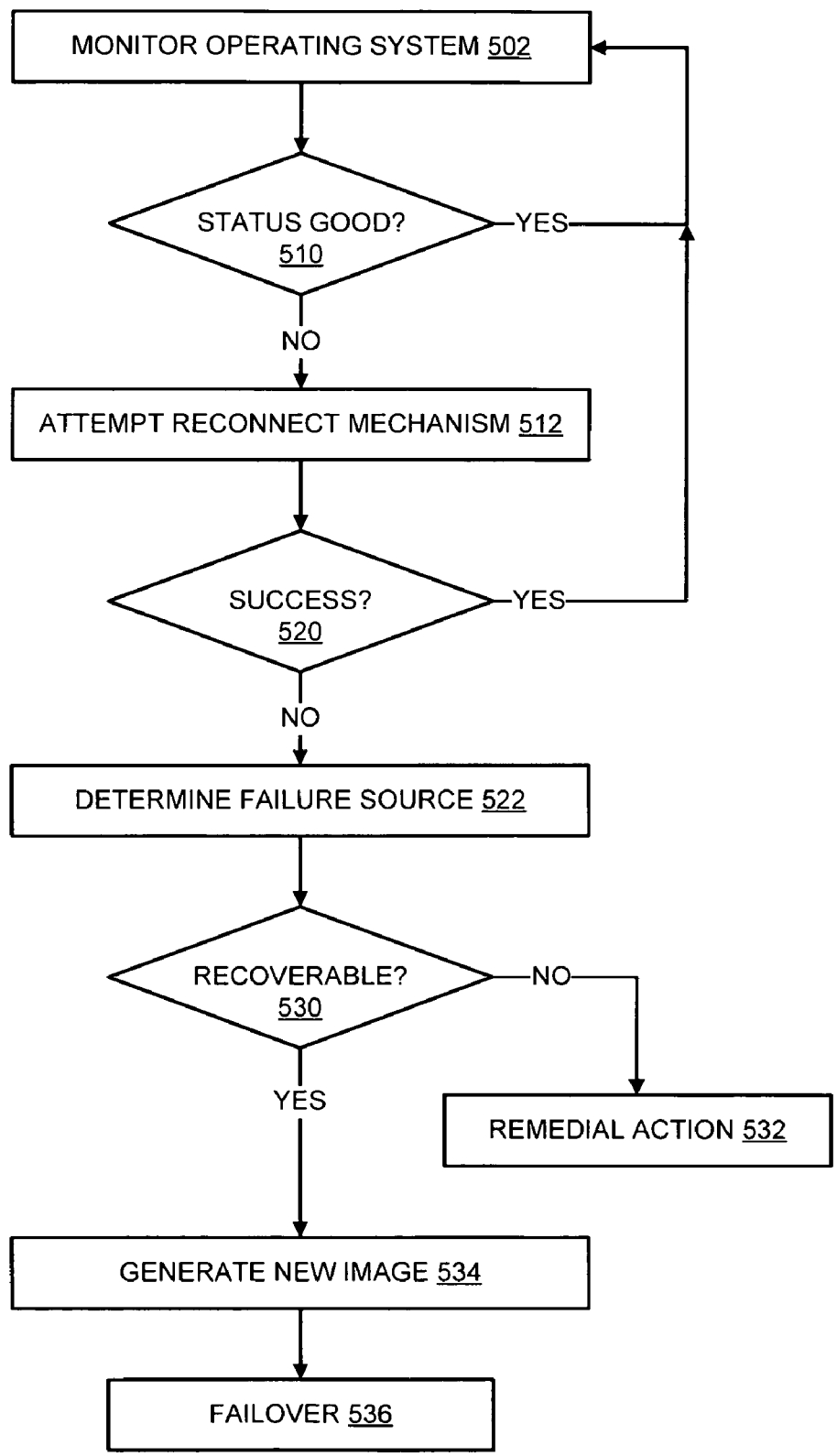
FIG. 5 is a flow diagram of an embodiment of dealing with an operating system error.

FIG. 5 is a flow diagram of an embodiment of dealing with an operating system error. An HACM monitors an operating system, 502. Generally multiple operating systems cannot coexist on a single partition. Thus, monitoring the operating system will generally include monitoring a partition on which the operating system exists. As long as the status of the operating system is good, 510, then the HACM can continue to simply monitor the operating system. If the HACM detects an error with the operating system, the HACM may optionally attempt to reconnect or otherwise recover the operating system, 512. Reconnecting here refers to attempting to regain connectivity, or attempting to achieve responsiveness from the operating system.

If the HACM is successful in reconnecting to the operating system, 520, the HACM can continue to monitor the operating system. If the attempts are not successful, 520, the HACM can determine a source of the failure, 522. Determining the source of the error may include performance of a diagnostic step or routine, including system component reloads, or system management routines. Isolating the failure can determine whether the operating environment has been compromised, or whether there is a recoverable error. In the case of a recoverable error, such as a software glitch, or system compromise due to a malware attack, the system may be able to be recovered with the use of the diagnostics. If the error is non-recoverable, or at least not immediately recoverable with system diagnostic techniques, or recoverable from switching partitions, the unrecoverable error may be noted.

If the error is unrecoverable, 530, remedial action can be taken, 532, which may include isolation of the system, as with AMT, reporting to a remote administrator, etc. If the error is recoverable with a partition switch, 530, the HACM generates a new image, 534. The new image will be a secondary partition for the new primary partition. The HACM can then failover, or switch from the corrupt partition to the new primary partition, 536.

Figure 6:
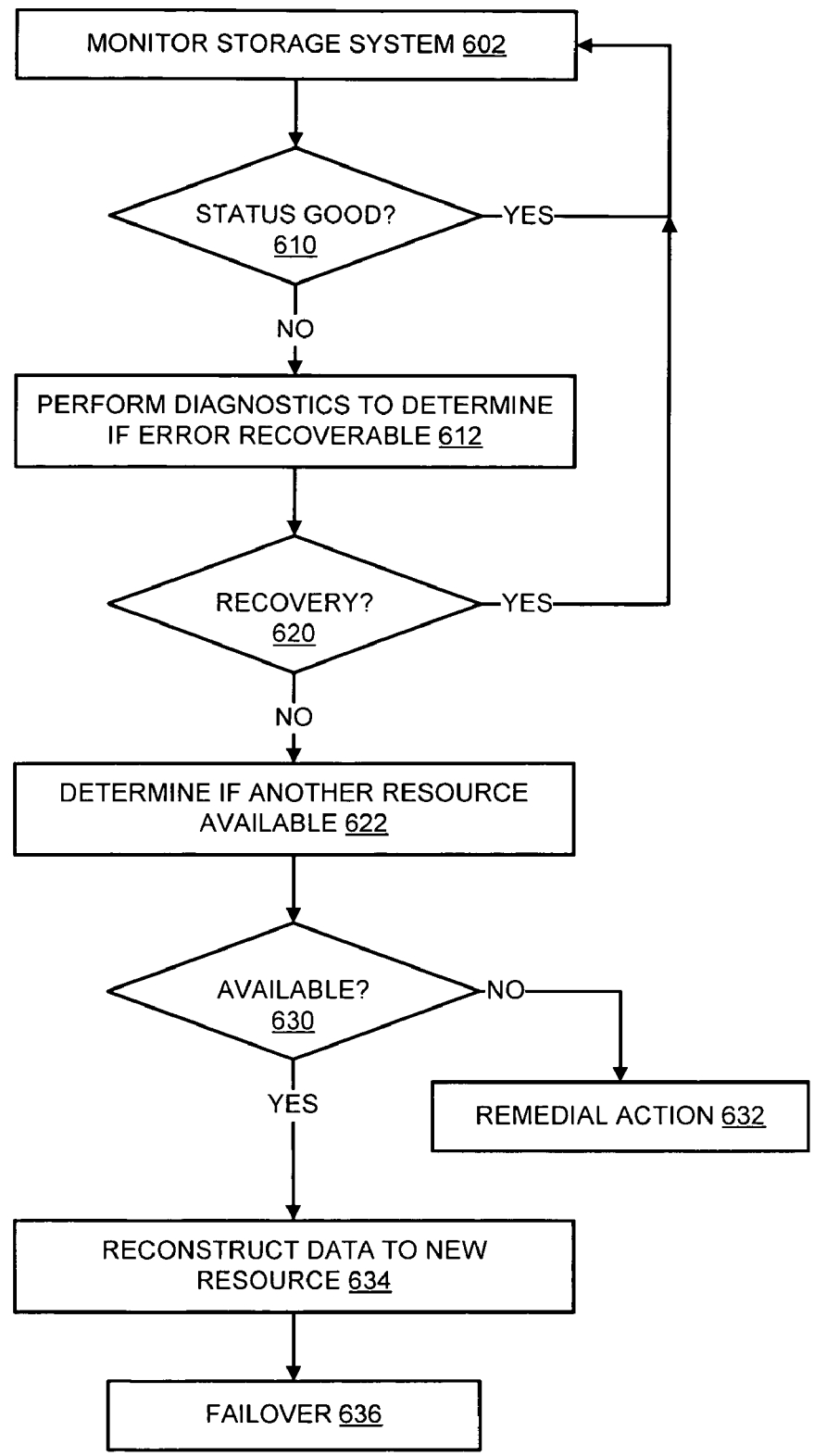
FIG. 6 is a flow diagram of an embodiment of dealing with a hardware resource error.

FIG. 6 is a flow diagram of an embodiment of dealing with a hardware resource error. An HACM can monitor a storage system, 602, which may include multiple storage devices. As long as the status of the primary storage device is good, 610, the HACM continues to monitor the system. If the primary storage device is determined to change status to an error condition, the HACM may perform diagnostics or cause diagnostics to be performed on the storage device to determine if the error is recoverable, 612. If the error is successfully recovered, 620, the HACM continues to monitor the storage device. If recovery is not achieved, 620, the HACM optionally determines if another storage resource is available, 622. Another storage resource may not be available if the system has the HACM, but is not equipped with a backup storage device, or if there was a failure of the backup device(s). If another storage resource is not available, the system can attempt remedial action, 632, for example, notifying an administrator. However, data may be lost. If another resource is available, the HACM can reconstruct data to the backup storage resource, 634, and failover to the new storage resource, 638. In one embodiment, as discussed above, RAID is implemented among available storage resources. In the case that the failover leaves only a single storage resource, RAID may be discontinued. In the case that the failover leaves multiple storage resources, the HACM can determine to continue implementing RAID with what storage resources remain.

Figure 7:
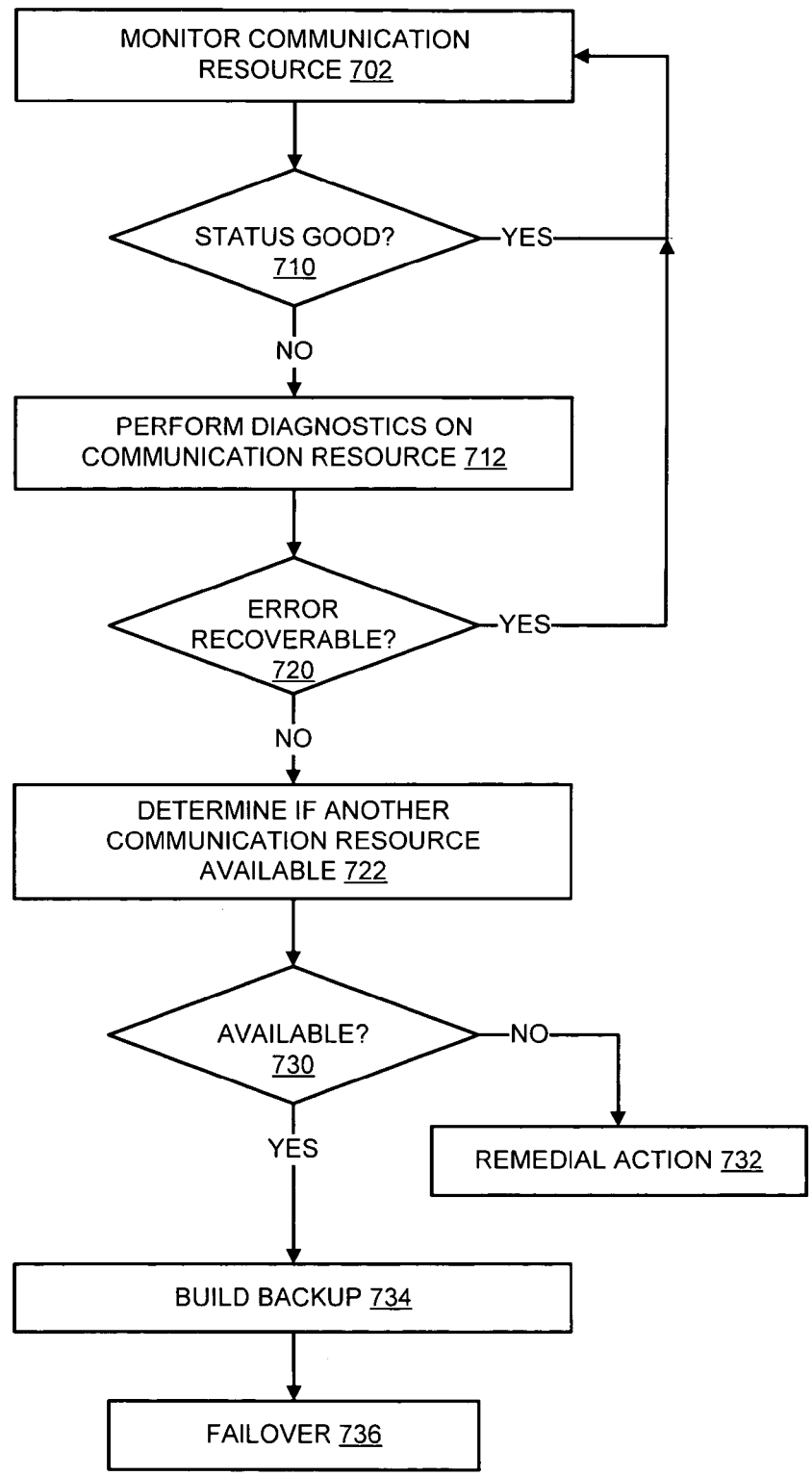
FIG. 7 is a flow diagram of an embodiment of dealing with a communication system error.

FIG. 7 is a flow diagram of an embodiment of dealing with a communication system error. The HACM may monitor a communication resource, 702. As long as the status of the communication resource is good, 710, the HACM can continue to monitor for error conditions. If the status indicates a failure, the HACM can perform diagnostics on the communication resource to determine the cause of the failure and determine if the failure is recoverable, 712. If the error is recoverable, 720, the HACM can return to monitoring the communication resource. If the error is not recoverable, the HACM can determine if another communication resource is available, 722. In one embodiment, this may involve determining if it is possible to switch from a wireless to a wired connection, or vice versa, or whether another wireless communication resource is available (e.g., an SDR, another hardware radio, another hardware component), 722.

If another communication resource is not available, 730, the HACM may initiate remedial action, 732. Remedial action may refer to disabling network connections. If another communication resource is available, the HACM can build the backup resource, 734, for example, by generating a new SDR, establishing a connection with another communication resource, incorporating another communication resource, and/or other action to restore/maintain communication. In one embodiment, building the backup resource involves communication over an OOB management link. The communication over the OOB management link may include remote error recovery, diagnostics, rebuilding, etc. The HACM can then failover to the backup communication resource, 736.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
monitoring multiple resources of a computer platform, including an operating system, with a single heterogeneous resource manager that monitors multiple resource types that are of different types, each type including a primary resource and an associated secondary resource, where the associated secondary resource is a backup to the primary resource on the computer platform, and where one resource type includes a first and a second virtual partition of the operating system as the primary resource and the associated secondary resource respectively;
detecting a failure of a monitored primary resource on the computing platform; and
automatically failing over from the failed primary resource to the associated secondary resource in response to detecting the failure.

2. A method according to claim 1, wherein detecting the failure comprises determining a change in the status of the primary resource.

3. A method according to claim 1, wherein detecting the failure comprises detecting a loss of connectivity to the primary resource.

4. A method according to claim 1, wherein the multiple resources comprise: a storage device and a network interface.

5. A method according to claim 1, wherein the automatically failing over from the primary resource to the associated secondary resource comprises switching from the first virtual partition to the second virtual partition of the operating system.

6. A method according to claim 5, further comprising:
generating a third virtual partition to act as a backup to the second virtual partition; and
removing the first virtual partition.

7. A method according to claim 6, further comprising:
generating a tertiary virtual partition to act as a backup to the second virtual partition.

8. A method according to claim 1, further comprising:
performing a diagnostic check on the primary resource in response to detecting the failure to attempt to recover the primary resource;
wherein automatically failing over to the secondary resource occurs if performing the diagnostic check fails to recover the resource.

9. An article of manufacture comprising a machine-accessible storage medium having computer-readable instructions stored therein, which when executed cause a machine to perform operations including:
monitoring multiple resources of a computer platform, including an operating system, with a single heterogeneous resource manager that monitors multiple resource types that are of different types, each type including a primary resource and an associated secondary resource, where the associated secondary resource is a backup to the primary resource on the computer platform, and where one resource type includes a first and a second virtual partition of the operating system as the primary resource and the associated secondary resource respectively;
detecting, with the single heterogeneous resource manager a failure of a monitored primary resource on the computing platform;
performing an error recovery routine to restore the primary resource in response to determining the error condition; and
automatically failing over to the backup resource if performing the error recovery routine fails to restore the primary resource.

10. An article of manufacture according to claim 9, wherein detecting the failure further comprises instructions for detecting one or more of an error state of the primary resource or a loss of connectivity to the primary resource.

11. An article of manufacture according to claim 9, wherein the multiple resources comprises: one of a storage device and a network interface.

12. An article of manufacture according to claim 9, wherein the automatically failing over from the primary resource to the associated secondary resource comprises switching from the first virtual partition to the second virtual partition of the operating system, and wherein managing the computing platform further comprises generating a tertiary virtual partition of the operating system to act as the backup to the second virtual partition of the operating system.

13. An article of manufacture according to claim 9, wherein the primary resource is a wireless network interface, and wherein failing over to the backup resource further comprises instructions for generating a software defined radio as the backup resource.

14. An apparatus comprising:
a hardware computing platform having a primary and an associated secondary resource, the secondary resource to provide a backup for the primary resource, the primary resource and the associated secondary resources to be one of multiple different resource types on the hardware computing platform; and
a single heterogeneous resource manager coupled with the hardware computing platform to:
monitor the multiple different resource types, including an operating system, on the hardware computing platform;
determine the primary resource has experienced an unrecoverable error, where the primary and associated secondary resources include a first and a second virtual partition of the operating system respectively;
switch the hardware computing platform from the primary resource to the associated secondary resource in response to determining the unrecoverable error; and
indicate the unrecoverable error to a remote device via an out-of-band communication channel.

15. An apparatus according to claim 14, wherein the primary and the associated secondary resources comprise storage devices, and wherein switching to the associated secondary resource comprises switching to a backup storage device.

16. An apparatus according to claim 14, the single resource manager to further generate a tertiary virtual partition of the operating system to act as a backup to the second virtual partition which is a backup to the first virtual partition.

17. A system comprising:
a hardware computing platform having a primary resource and an associated secondary resource, the associated secondary resource to provide a backup for the primary resource, the primary resource and the associated secondary resource to be one of multiple resource types on the hardware computing platform;
a single heterogeneous resource manager coupled with the hardware computing platform to;
monitor the multiple different resource types, including an operating system, on the hardware computing platform;
determine the primary resource has experienced an unrecoverable error, where the primary and associated secondary resources include a first and a second virtual partition of the operating system respectively; and
switch the hardware computing platform from the primary resource to the associated secondary resource in response to determining the unrecoverable error; and
a twisted pair interface port on the hardware computing platform and coupled with the single heterogeneous resource manager, to provide a wired connection having the out-of-band communication channel.

18. A system according to claim 17, the single resource manager to generate a tertiary virtual partition of the operating system to backup the second virtual partition which is a backup to the first virtual partition.

19. A system according to claim 17, wherein to determine the primary resource has experienced an unrecoverable error further comprising the single heterogeneous resource manager to perform a recovery routine on the primary resource.

* * * * *